United States Patent
Huang (10) Patent No.: US 8,585,001 B2
(45) Date of Patent: Nov. 19, 2013

(54) SUPPORT ARM STRUCTURE

(76) Inventor: Ming Hua Huang, Kaohsiung (TW)

(*) Notice: Subject to any disclaimer, the term of this patent is extended or adjusted under 35 U.S.C. 154(b) by 0 days.

(21) Appl. No.: 13/478,098

(22) Filed: May 22, 2012

(65) Prior Publication Data

US 2013/0161465 A1 Jun. 27, 2013

(30) Foreign Application Priority Data

Dec. 22, 2011 (TW) .............................. 100224224 U (51) Int. Cl.
*E04G 3/00* (2006.01)
(52) U.S. Cl.
USPC ..................... 248/284.1; 248/278.1; 248/371; 248/921; 248/922
(58) Field of Classification Search
USPC ......... 248/370, 371, 917, 919, 920, 921, 922, 248/923, 276.1, 282.1, 284.1, 278.1, 248/292.13, 291.1
See application file for complete search history.

(56) References Cited

U.S. PATENT DOCUMENTS

| | | | | |
|---|---|---|---|---|
| 6,550,734 B1* | 4/2003 | Spadea | .................... | 248/280.11 |
| 6,896,230 B2* | 5/2005 | Cvek | .......................... | 248/276.1 |
| 7,188,812 B2* | 3/2007 | Wang | ........................ | 248/276.1 |
| 7,207,537 B2* | 4/2007 | Hung | ........................ | 248/284.1 |
| 7,364,127 B2* | 4/2008 | Huang | ....................... | 248/276.1 |
| 7,395,995 B2* | 7/2008 | Chen | .......................... | 248/284.1 |
| 7,546,994 B2* | 6/2009 | Altonji et al. | ............. | 248/276.1 |
| 7,748,666 B2* | 7/2010 | Oddsen et al. | ........... | 248/123.11 |
| 8,328,151 B2* | 12/2012 | Gwag | ....................... | 248/284.1 |

* cited by examiner

*Primary Examiner* — Steven Marsh
(74) *Attorney, Agent, or Firm* — Leong C. Lei (57) ABSTRACT

An improved support arm structure comprises a base joint, a primary arm assembly, and an extension arm assembly pivotally connected to the primary arm assembly; wherein the base joint is provided for connecting the primary arm assembly to a wall bracket; a rear end of the primary arm assembly is connected to the base joint; a front end of the primary arm assembly is connected to a middle joint; a first spring is provided in the primary arm assembly; a rear end of the extension arm assembly is connected to the middle joint; a front end of the extension arm assembly is connected to a front elongated joint; a second spring is provided in the extension arm assembly; whereby the support arm structure can be adjusted to any angles according to the requirements of a user and can be operated conveniently and safely.

8 Claims, 7 Drawing Sheets

SUPPORT ARM STRUCTURE

TECHNICAL FIELD OF THE INVENTION

The present invention relates to an improved arm structure and, more particularly, to an arm structure that can mitigate the drawbacks of conventional arm structures and can be operated conveniently and safely to meet the angle requirements of a user.

DESCRIPTION OF THE PRIOR ART

Figure 1:
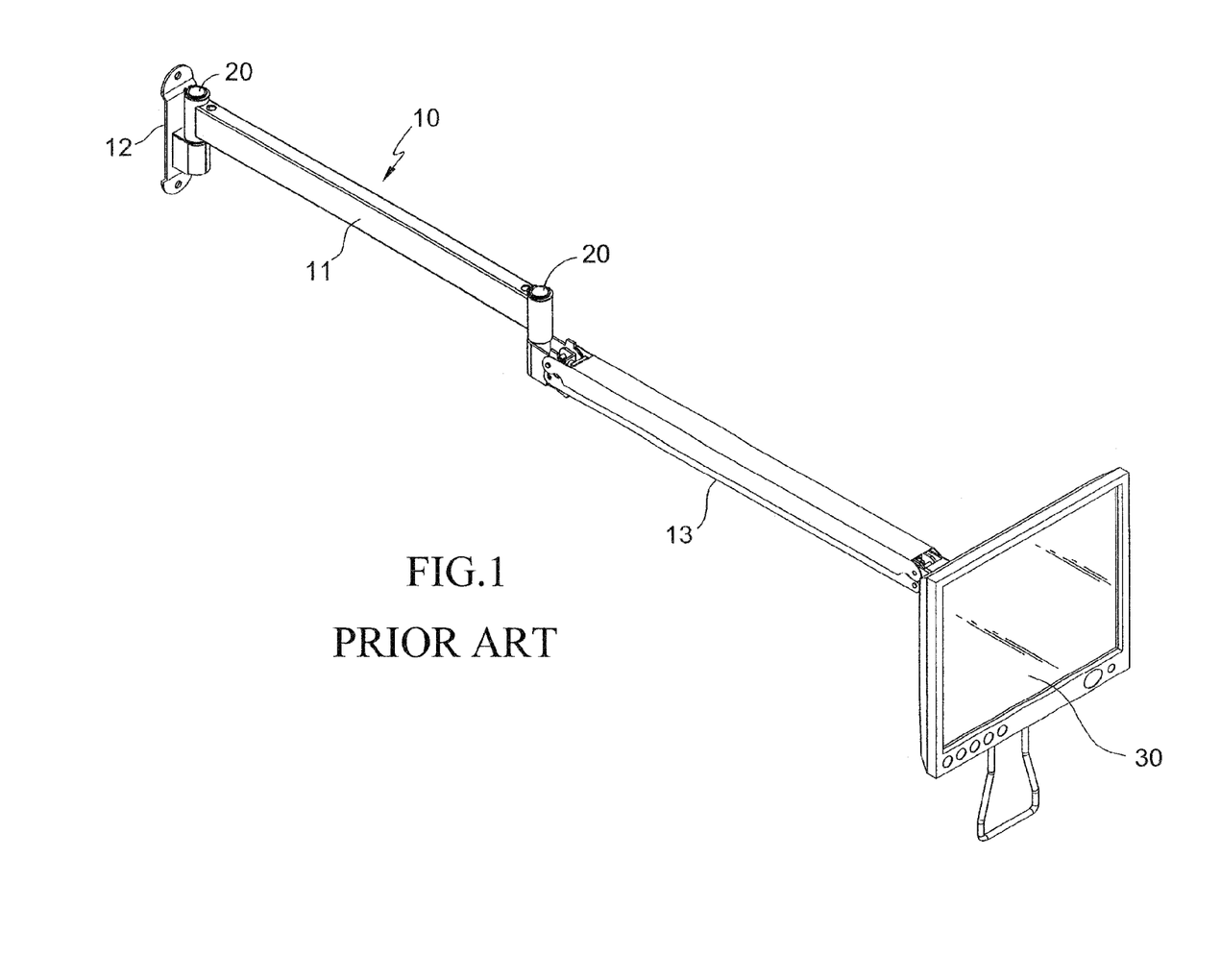
FIG. 1 shows a 3-dimensional view of a conventional support arm structure.
Figure 2:
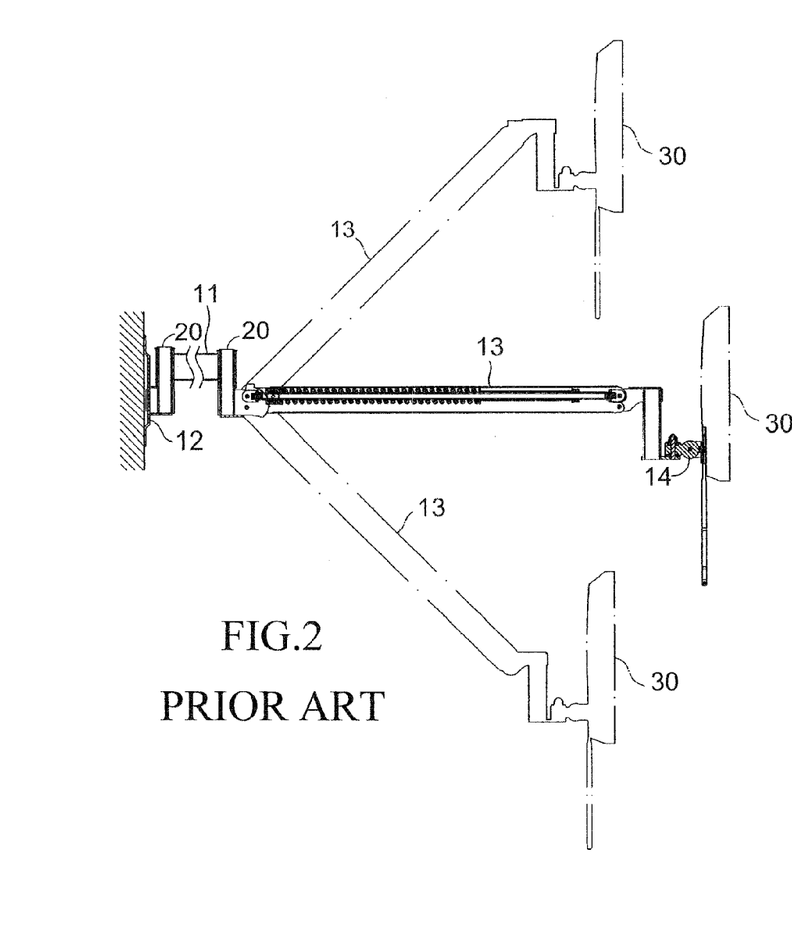
FIG. 2 shows a sectional view of the conventional support arm structure.

As shown in FIGS. 1 and 2, a conventional support aim structure 10 comprises a primary arm 11, a mounting base 12, and an extension aim 13. The rear end of the primary arm 11 is pivotally connected to the mounting base 12 by using a pin 20 to allow the primary arm 11 to be rotated horizontally relative to the mounting base 12. The front end of the primary arm 11 is pivotally connected to the extension arm 13 by using another pin 20 inserted into a joint to allow the extension arm 13 to be rotated horizontally relative to the joint, wherein the joint allows the extension arm 13 to be rolled in vertical direction. Furthermore, the front end of the extension arm 13 is pivotally connected to a mounting frame 14 for mounting a display 30. With the support aim structure 10, the display 30 mounted on the mounting frame 14 can be adjusted to an angle.

The height of the display 30 is adjusted through the joint between the primary arm 11 and the extension arm 13. However, for increasing the security and stability of the support arm structure 10 of the type, the rolling angle (vertical direction) of the extension arm 13 should be limited. Thus, the display 30 cannot be raised or lower too much, thereby causing inconvenience for persons having a higher or shorter height. Besides, the support arm structure 10 of the type can only be folded through horizontal rotations. Consequently, folding the structure will require a large space and accidental injuries to other persons around the structure may occur.

SUMMARY OF THE INVENTION

The primary object of the present invention is to provide an improved support arm structure that can mitigate the drawbacks of conventional arm structures and can be operated conveniently and safely to meet the angle requirements of a user.

To achieve the above object, the improved support arm structure may comprise a base joint, a primary arm assembly, and an extension arm assembly pivotally connected to the primary arm assembly; wherein:

the base joint is provided for connecting the primary arm assembly to a wall bracket that can be fixed onto a wall, the base joint being provided with a pin pivotally fitted in the wall bracket to allow the base joint to be rotated horizontally about the pin;

the primary arm assembly includes an upper arm and a lower arm, wherein a rear end of the upper arm and a rear end of the lower arm are respectively connected to the base joint; a front end of the upper arm and a front end of the lower arm are respectively connected to a middle joint; between the upper arm and the lower arm is provided with a first spring, two ends of the first spring being respectively connected to the upper arm and the lower arm, so that the upper arm and the lower arm can be rolled in a synchronized way;

the extension arm assembly includes an upper arm and a lower arm, wherein a rear end of the upper arm of the extension arm assembly and a rear end of the lower arm of the extension arm assembly are respectively connected to the middle joint; a front end of the upper arm of the extension arm assembly and a front end of the lower arm of the extension arm assembly are respectively connected to a front elongated joint; between the upper arm and the lower arm of the extension arm assembly is provided with a second spring, two ends of the second spring being respectively connected to the upper arm of the extension arm assembly and the front elongated joint, so that the upper arm and the lower arm of the extension arm assembly can be rolled in a synchronized way;

whereby, the support arm structure can be adjusted to any angles according to the requirements of a user and can be operated conveniently and safely.

Other objects, advantages, and novel features of the present invention will become more apparent from the following detailed description when taken in conjunction with the accompanying drawings.

DETAILED DESCRIPTION OF THE PREFERRED EMBODIMENTS

To achieve the purpose of the present invention, the technical means and the structure implemented thereby will be detailed below with reference to FIGS. 3-7 of the accompanying drawings.

Figure 3:
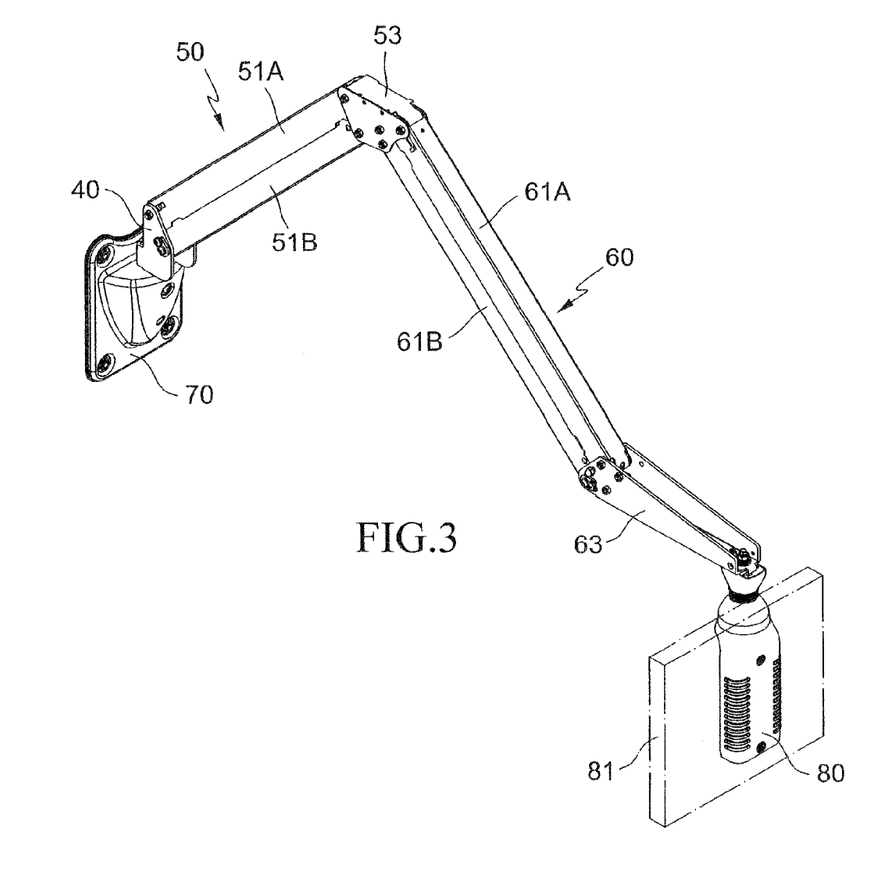
FIG. 3 shows a 3-dimensional view of one embodiment of the present invention.

As shown in FIG. 3, an improved support arm structure according to one embodiment of the present invention generally comprises a base joint 40, a primary arm assembly 50, an extension arm assembly 60 pivotally connected to the primary arm assembly 50.

The base joint 40 is provided for connecting the primary arm 50 assembly to a wall bracket 70 that can be fixed onto a wall, wherein the base joint 40 is provided with a pin 41 (see FIG. 4) pivotally fitted in the wall bracket 70 to allow the base joint 40 to be rotated horizontally about the pin 41.

As shown in FIGS. 4-7, the primary support arm assembly 50 includes an upper aim 51A and a lower arm 51B. A rear end of the upper arm 51A is pivotally connected to the base joint 40 through a set of fixing elements 52A inserted with a shaft 521, wherein the shaft 521 can increase the stability of the upper arm 51A, so that the upper arm 51A can be rolled about the set of fixing elements 52A (in vertical direction). A rear end of the lower arm 51B is pivotally connected to the base joint 40 through a set of fixing elements 52B engaged with a blocking piece 522, wherein the blocking piece 522 defines a cutout 523 to be engaged with the base joint 40 so as to increase the stability of the lower arm 51B, so that the lower arm 51B can be rolled about the fixing element 52B provided at the rear end of the lower arm 51B. A middle joint 53 is provided at a front of the primary arm assembly 50, wherein a front end of the upper arm 51A and a front end of the lower arm 51B are pivotally connected to the middle joint 53 respectively through two sets of fixing elements 54A, 54B, each set being inserted with a shaft 541, 542 so as to increase the stability of the upper arm 51A and the lower arm 51B, so that the upper arm 51A and the lower arm 51B can be respectively rolled about the two sets of fixing elements 54A, 54B provided at the front ends thereof (in vertical direction). Between the upper arm 51A and the lower arm 51B is provided with a first spring 55. A rear end of the first spring 55 is attached to a front end of a first threaded rod 551. A rear end of the first threaded rod 551 is connected to the upper arm 51A through a positioning element 552. A front end of the first spring 55 is connected to the shaft 542 inserted between the lower arm 51B and the middle joint 53. Due to the upper arm 51A and the lower aim 51B being pivotally connected to the base joint 40 and the middle joint 53, the upper arm 51A and the lower arm 51B can be rolled in a synchronized way and moved in a limited way without causing separation thereof.

Figure 4:
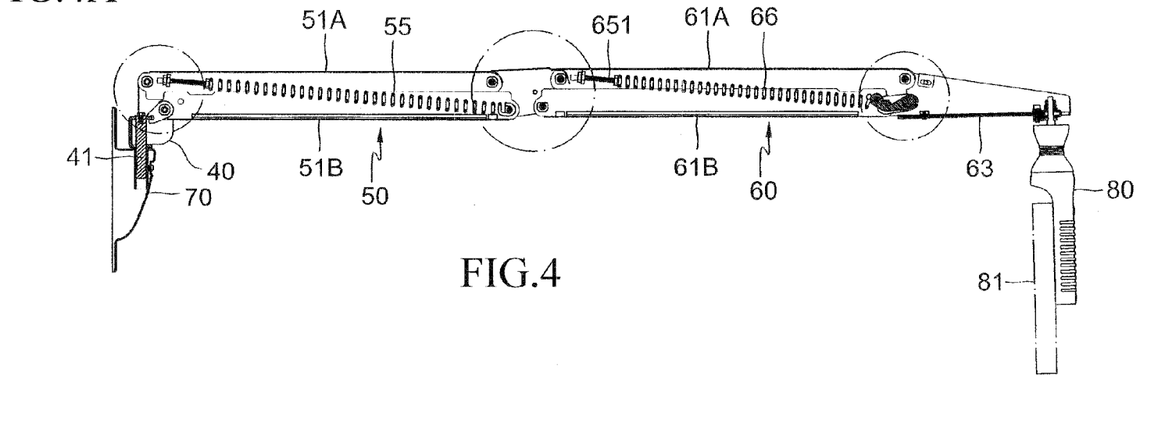
FIG. 4 shows a sectional view of the embodiment of the present invention.
Figure 4A:
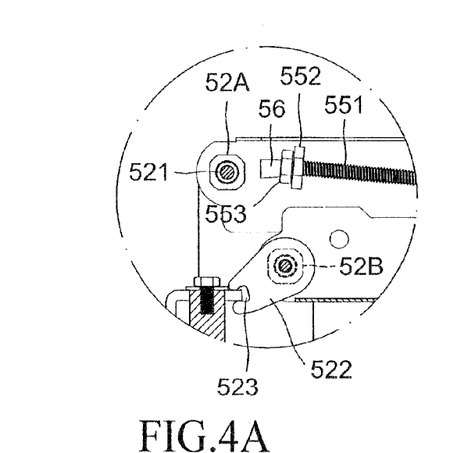
FIGS. 4A, 4B, 4C respectively show a partially enlarged sectional view of the embodiment of the present invention.
Figure 4B:
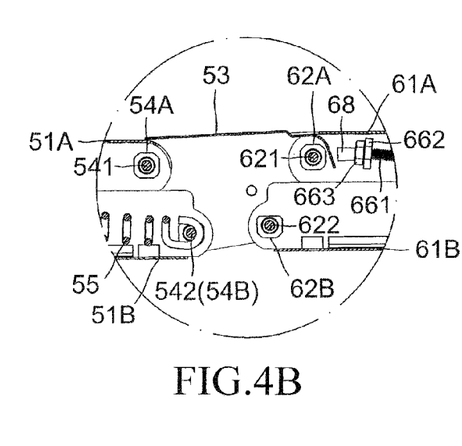
Figure 4C:
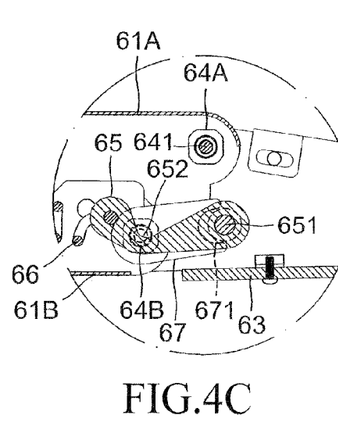
Figure 5:
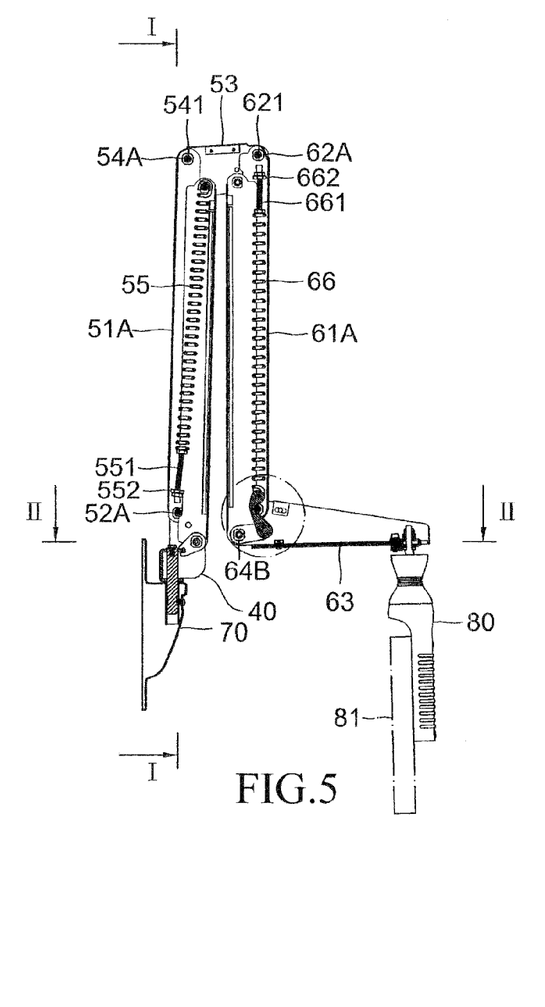
FIG. 5 shows a sectional view of the embodiment of the present invention, wherein the primary arm assembly and the extension arm assembly thereof are positioned adjacent to the wall.
Figure 5A:
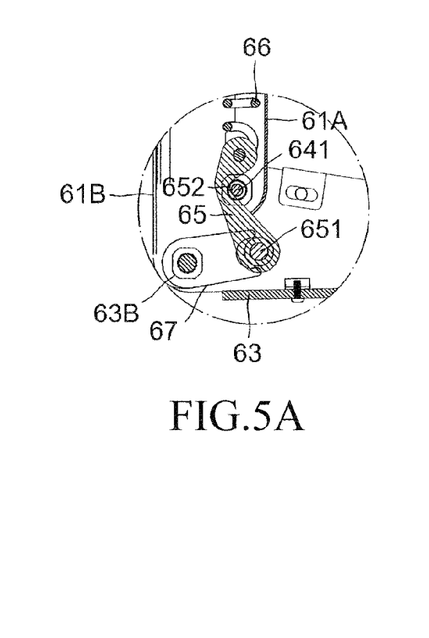
FIG. 5A shows a partially enlarged sectional view of the embodiment of the present invention.
Figure 6:
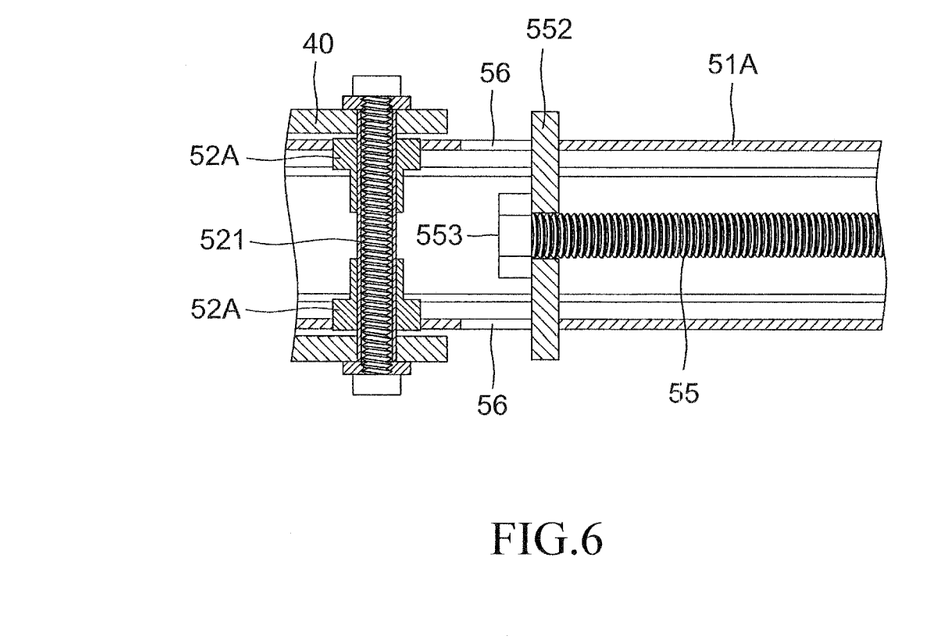
FIG. 6 shows an enlarged sectional view take along I-I line in FIG. 5.

As shown in FIGS. 4-6, the extension arm assembly 60 includes an upper arm 61A and a lower arm 61B, wherein a rear end of the upper arm 61A and a rear end of the lower arm 61B are pivotally connected to the middle joint 53 respectively through two sets of fixing elements 62A, 62B, each set being inserted with a shaft 621, 622 so as to increase the stability of the upper arm 61A and the lower arm 61B, so that the upper arm 61A and the lower arm 61B can be respectively rolled about the two sets of fixing elements 62A, 62B provided at the rear ends thereof (in vertical direction). A front elongated joint 63 is provided at a front of the extension arm assembly 60, wherein a front end of the upper arm 61A is pivotally connected to the front elongated joint 63 through a set of fixing elements 64A inserted with a shaft 641, wherein the shaft 641 can increase the stability of the upper arm 61A, so that the upper arm 61A can be rolled about the fixing element 64A provided at the front end thereof (in vertical direction); a front end of the lower arm 61B is pivotally connected to the front elongated joint 63 through a set of fixing elements 64B engaged with a blocking piece 67, so that the lower arm 61B can be rolled about the set of fixing elements 64B provided at the front end thereof (in vertical direction). Furthermore, an engaging element 65 is provided at a rear end of the front elongated joint 63. The engaging element 65 is pivotally connected to the front elongated joint 63 through a shaft 651, so that the engaging element 65 can be turned about the shaft 651 provided thereat. The engaging element 65 is configured with a recessed portion 652, so that when the engaging element 65 is turned upwardly, the recessed portion 652 of the engaging element 65 can abut the shaft 641 provided at the front end of the upper arm 61A, thereby limiting a rolling range of the upper arm 61A. Between the upper arm 61A and the lower arm 61B of the extension arm assembly 60 is provided with a second spring 66. A rear end of the second spring 66 is attached to a front end of a second threaded rod 661. A rear end of the second threaded rod 661 is connected to the upper arm 61A through a positioning element 662. A front end of the second spring 66 is connected to the engaging element 65. Due to the upper arm 61A and the lower arm 61B is pivotally connected to the middle joint 53 and the front elongated joint 63, the upper arm 61A and the lower arm 61B can be rolled in a synchronized way and moved in a limited way without causing separation thereof. Furthermore, the blocking piece 67, which is provided at the front end of the lower arm 61B, defines a cutout 671 to be engaged with the shaft 651 provided at the engaging element 65.

As shown in FIG. 6, the rear end of the upper arm 51A of the primary arm assembly 50 defines a hollow hole 56, and the positioning element 552 provided at the rear end of the first threaded rod 551 is placed across the hollow hole 56, wherein the positioning element 552 abuts one side of the hollow hole 56 so as to fix the first spring 55.

Furthermore, an adjustment nut 553 is provided at a rear side of the positioning element 552 provided for the first threaded rod 551 for threadedly engaged with the first threaded rod 551 for adjusting a force supplied from the first spring 55.

Similarly, the rear end of the upper arm 61A of the extension arm assembly 60 defines a hollow hole 68, and the positioning element 662 provided at the rear end of the second threaded rod 661 is placed across the hollow hole 68, wherein the positioning element 662 abuts one side of the hollow hole 68 so as to fix the second spring 66.

Furthermore, an adjustment nut 663 is provided at a rear side of the positioning element 662 provided for the second threaded rod 661 for threadedly engaged with the second threaded rod 661 for adjusting a force supplied from the second spring 66.

Furthermore, a mounting frame 80 is pivotally connected to a front end of the front elongated joint 63 for mounting a display 81, wherein the mounting frame 80 is located substantially perpendicular to the front elongated joint 63.

Preferably, the fixing elements 52A, 52B, 54A, 54B of the primary arm assembly 50 and the fixing elements 62A, 62B, 64A, 64B of the extension arm assembly 60 can be self-lubricating parts made from powdered metals, which allows the primary arm assembly 50 and the extension arm assembly 60 to be moved more smoothly, and can reduce the noise resulted from friction during movement.

Figure 7:
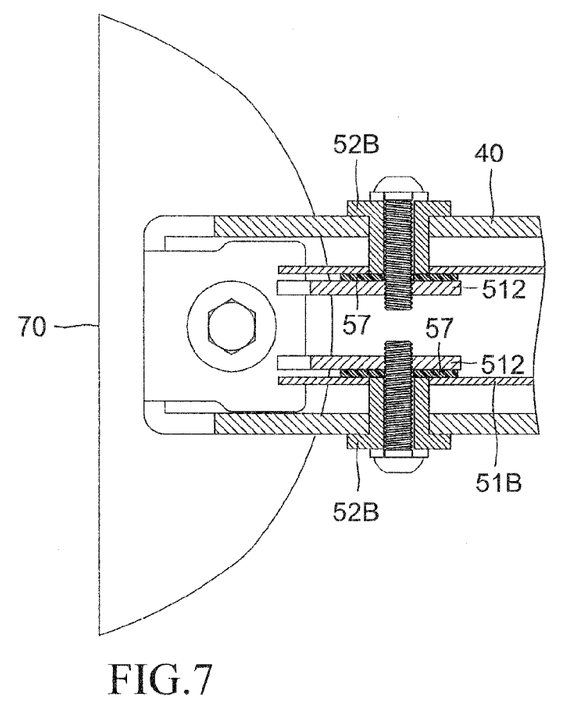
FIG. 7 shows an enlarged cross-sectional view take along II-II line in FIG. 5.

Furthermore, as shown in FIG. 7, an anti-slip pad 57 can be placed between the blocking piece 522, which is provided at the rear end of the lower arm 51B of the primary arm assembly 50, and the lower arm 51B of the primary arm assembly 50. The anti-slip pad 57 can be made of fiberglass material, so that it can provide a braking effect for the lower arm 51B during a rolling movement.

In use, the primary arm assembly 50 can be rolled downwardly about the fixing elements 52A, 52B, while the extension arm assembly 60 can be rolled upwardly about the fixing elements 62A, 62B, so that the display 81 can be adjusted to a height according to the requirement of a user. Alternatively, the primary arm assembly 50 and the extension arm assembly 60 can be adjusted to have a horizontal orientation, as shown in FIG. 4, wherein the first spring 55 and the second spring 66 can share the load exerted by the display 81, so that the primary arm assembly 50 and the extension arm assembly 60 can be prevented from deviating from their original positions, so that the display 81 can be maintained at an accurate and constant height. When the support arm structure is desired to be folded into a compact form, the primary arm assembly 50 can be rolled upwardly about the fixing elements 52A, 52B, so that the primary arm assembly 50 can be positioned in a vertical orientation, and then the extension arm assembly 60 can be rolled downwardly so as to come close to the primary arm assembly 50, so that the extension arm assembly 60 can also be positioned in a vertical orientation. Thus, the support arm structure can come close to the wall, as shown in FIG. 5. In such condition, the recessed portion 652 of the engaging member 65 abuts the shaft 641 provided at the front end of the upper arm 61A and the front elongated joint 63 is positioned in a horizontal orientation. The folding operation of the present support arm structure is more convenient and safe than that of the conventional support arm structure.

In light of the foregoing, the present invention can mitigate the drawbacks of the conventional support arm structure to provide an improved support arm structure that can meet a user's requirements and can be operated and adjusted more conveniently and safely.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. An improved support arm structure, comprising a base joint, a primary arm assembly, and an extension arm assembly pivotally connected to said primary arm assembly; wherein:

said base joint is provided for connecting said primary arm assembly to a wall bracket that can be fixed onto a wall, said base joint being provided with a pin pivotally fitted in said wall bracket to allow said base joint to be rotated horizontally about said pin;

said primary arm assembly includes an upper arm and a lower arm, wherein a rear end of said upper arm is pivotally connected to said base joint through a fixing element inserted with a shaft, so that said upper arm can be rolled about said fixing element; a rear end of said lower arm is pivotally connected to said base joint through a fixing element engaged with a blocking piece that defines a cutout to be engaged with said base joint, so that said lower arm can be rolled about the fixing element provided at the rear end of said lower arm; a middle joint is provided at a front of said primary arm assembly, wherein a front end of said upper arm and a front end of said lower arm are pivotally connected to said middle joint respectively through two fixing elements each being inserted with a shaft, so that said upper arm and said lower arm can be respectively rolled about the two fixing elements provided at the front ends thereof; a first spring is provided between said upper arm and said lower arm, a rear end of said first spring being attached to a front end of a first threaded rod, a rear end of said first threaded rod being connected to said upper arm through a positioning element, a front end of said first spring being connected to the shaft inserted between said lower arm and said middle joint;

said extension arm assembly includes an upper arm and a lower arm, wherein a rear end of said upper arm of said extension arm assembly and a rear end of said lower arm of said extension arm assembly are pivotally connected to said middle joint respectively through two fixing elements being each inserted with a shaft, so that said upper and lower arms of said extension arm assembly can be respectively rolled about the fixing elements provided at the rear ends thereof; a front elongated joint is provided at a front of said extension arm assembly, wherein a front end of said upper arm of said extension arm assembly is pivotally connected to said front elongated joint through a fixing element inserted with a shaft, so that said upper arm of said extension arm assembly can be rolled about the fixing element provided at the front end thereof; a front end of said lower arm of said extension arm is pivotally connected to said front elongated joint through a fixing element engaged with a blocking piece, so that said lower arm of said extension arm can be rolled about the fixing element provided at the front end thereof; an engaging element is provided at a rear end of said front elongated joint, said engaging element being pivotally connected to said front elongated joint through a shaft so that said engaging element can be turned about the shaft provided thereat, said engaging element being configured with a recessed portion, so that when said engaging element is turned upwardly, said recessed portion of said engaging element can abut the shaft provided at the front end of said upper arm of said extension arm assembly, thereby limiting a rolling range of said upper arm of said extension arm assembly; a second spring is provided between said upper arm and said lower arm of said extension arm assembly, a rear end of said second spring being attached to a front end of a second threaded rod, a rear end of said second threaded rod being connected to said upper arm of said extension arm assembly through a positioning element, a front end of said second spring being connected to said engaging element; whereby, due to said upper and lower arms of said extension arm assembly being pivotally connected to said middle joint and said front elongated joint, said upper and lower arms of said extension arm assembly can be rolled in a synchronized way and moved in a limited way without causing separation thereof; the blocking piece provided at the front end of said lower arm of said extension arm assembly defines a cutout to be engaged with the shaft provided at said engaging element;

whereby, the support arm structure can be adjusted to any angles according to the requirements of a user and can be operated conveniently and safely.

2. The improved support arm structure of claim 1, wherein said fixing elements of said primary arm assembly and said extension arm assembly are self-lubricating parts made from powdered metals.

3. The improved support arm structure of claim 1, wherein said upper arm of said primary arm assembly defines a hollow hole, and the positioning element provided at the rear end of said first threaded rod is placed across said hollow hole.

4. The improved support arm structure of claim 1, wherein an adjustment nut is provided at a rear side of the positioning element provided for said first threaded rod for threadedly engaging with said first threaded rod for adjusting a force supplied from said first spring.

5. The improved support arm structure of claim 1, wherein said upper arm of said extension arm assembly defines a hollow hole, and the positioning element provided at the rear end of said second threaded rod is placed across said hollow hole.

6. The improved support arm structure of claim 1, wherein an adjustment nut is provided at a rear side of the positioning element provided for said second threaded rod for threadedly engaging with said second threaded rod for adjusting a force supplied from said second spring.

7. The improved support arm structure of claim 1, wherein an anti-slip pad is placed between the blocking piece, which is provided at the rear end of said lower arm of said primary arm assembly, and said lower arm of said primary arm assembly.

8. The improved support arm structure of claim 1, wherein a mounting frame is pivotally connected to a front end of said front elongated joint for mounting a display.

* * * * *